Figures 1, 2:
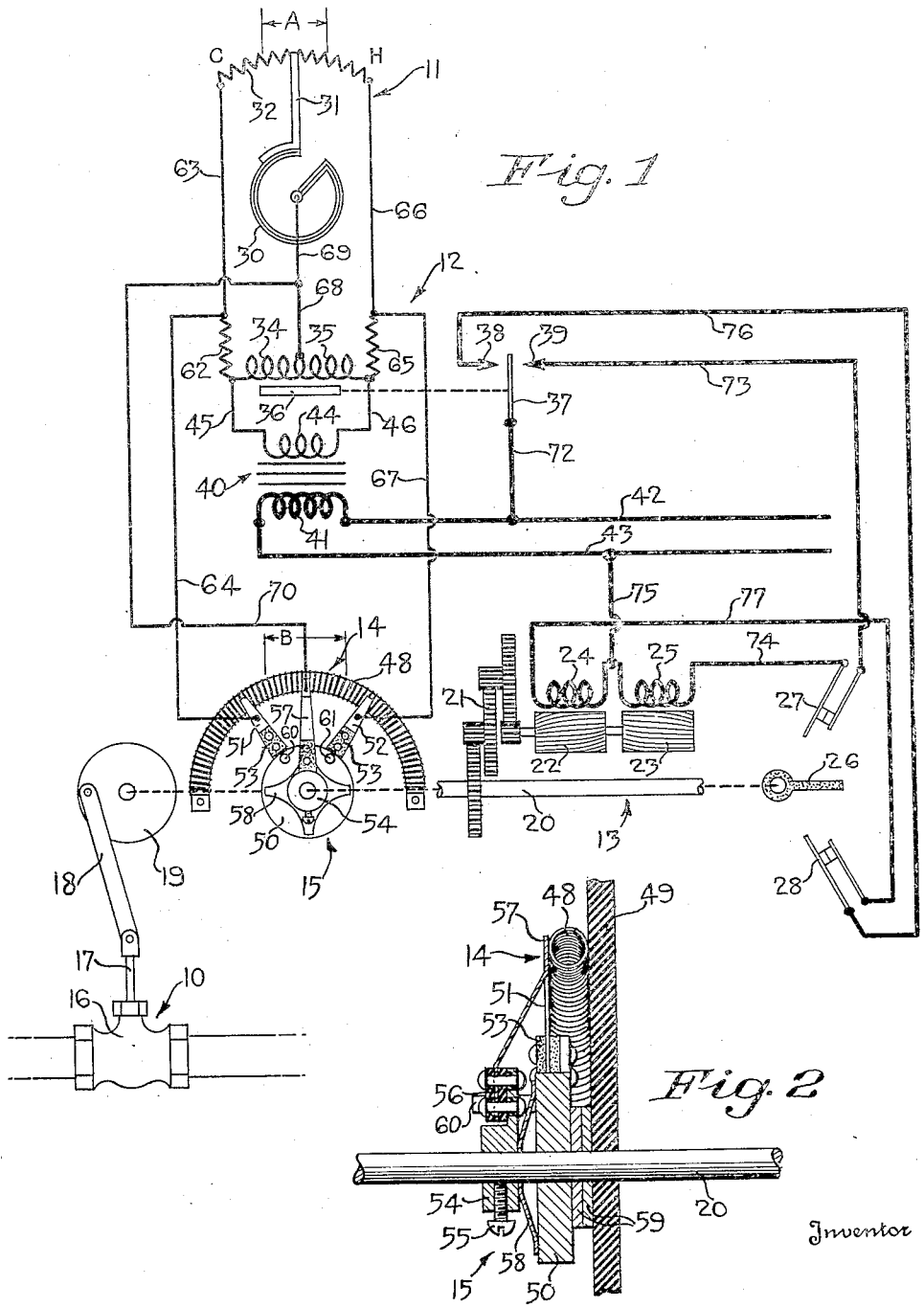

March 11, 1941. J. E. HAINES 2,234,913
AUTOMATIC RESET MECHANISM
Filed Nov. 23, 1936

Inventor
John E. Haines
By George H Fisher
Attorney

Patented Mar. 11, 1941

2,234,913

UNITED STATES PATENT OFFICE 2,234,913

AUTOMATIC RESET MECHANISM

John E. Haines, Minneapolis, Minn., assignor to Minneapolis-Honeywell Regulator Company, Minneapolis, Minn., a corporation of Delaware Application November 23, 1936, Serial No. 112,331

6 Claims. (Cl. 236—78)

This invention relates to automatic reset or load compensation mechanisms in general, and specifically, as applied to a follow-up system of the electrical type.

An object of this invention is to provide a control system having a device adapted to be positioned in a plurality of positions for controlling the value of a condition, a control device the state of which is varied in accordance with changes in the value of the condition to be controlled for controlling the device, and a follow-up means operated by the device whereby the device is positioned in accordance with changes in the value of the condition to maintain the value of the condition within certain limits, along with a reset or load compensation mechanism associated with the follow-up means for causing the device to assume different positions with respect to the value of the condition being controlled in accordance with changes in load.

Another object of this invention is to provide a combined follow-up and reset mechanism of novel construction for performing the desired results.

Other objects and advantages will become apparent to those skilled in the art upon reference to the accompanying specification, claims and drawing.

For a more thorough understanding of this invention, reference is made to the accompanying single sheet of drawing in which:

Figure 1 diagrammatically discloses a preferred form of my invention, and

Figure 2 is a sectional view of a portion of the construction illustrated diagrammatically in Figure 1.

Referring now to Figure 1 of the drawing, the device to be positioned in a plurality of positions to control the value of the condition to be controlled is generally designated at 10. The control means responsive to changes in the value of the condition to be controlled is generally designated at 11. The control means 11 controls the operation of a relay generally designated at 12 and this relay, in turn, controls the operation of a motor generally designated at 13. The motor 13 positions the device 10 and also operates a follow-up means generally designated at 14, which follow-up means also acts upon the relay 12 to afford a follow-up control system whereby the device 10 is positioned in accordance with changes in the value of the condition to be controlled to maintain the value of the condition to be controlled within predetermined limits. Associated with the follow-up means 14 is a reset mechanism generally designated at 15 and the function of this reset mechanism is to reset or reposition the device 10 with respect to the value of the condition whereby the condition to be controlled is maintained within narrower limits regardless of changes in load.

Although the control system of this invention may be utilized for controlling the value of any condition, it is shown for purposes of illustration as controlling a temperature condition and more particularly the temperature of a space (not shown). Therefore, the device 10 to be positioned in the plurality of positions is shown to be a valve 16 for controlling the supply of heating fluid to the space (not shown). The valve 16 is operated by a valve stem 17 which is connected by a pitman 18 to a crank disc 19 mounted on a shaft 20 of the motor 13. Shaft 20 is driven through a reduction gear train 21 by motor rotors 22 and 23. The motor rotors 22 and 23 are operated by field windings 24 and 25, the arrangement being such that when the field winding 25 is energized the valve 16 is moved towards an open position and when the field winding 24 is energized the valve 16 is moved towards a closed position. Shaft 20 also carries an abutment member 26 which is adapted to open limit switches 27 and 28 when the valve 16 is moved to either an extreme open or an extreme closed position, respectively.

The control means responsive to changes in the value of the condition to be controlled is illustrated as a thermostatic control means responsive to variations in space temperature. In this connection, a thermostatic element 30 operates a slider 31 with respect to a control potentiometer resistance element 32. Upon a decrease in space temperature, slider 31 is moved to the left in the direction indicated by the character C and upon an increase in space temperature, the slider 31 is moved to the right in the direction indicated by the character H. Preferably, when the space temperature is at the desired normal value, the slider 31 is maintained midway between the ends of the resistance element 32 in a position shown in Figure 1.

The relay generally designated at 12 comprises relay coils 34 and 35 for influencing an armature 36. The armature 36 is suitably connected to a switch arm 37 which is adapted to engage contacts 38 or 39. When the relay coil 34 is energized more than the relay coil 35, the switch arm 37 is moved into engagement with the contact 38 and when the relay coil 35 is energized more than the relay coil 34, the switch arm 37 is moved into engagement with the contact 39. When the relay coils 34 and 35 are equally energized, switch arm 37 is maintained midway between the contacts 38 and 39 and out of engagement with these contacts. Power is supplied to the relay 12 by a step-down transformer generally designated at 40 having a primary 41 connected across line wires 42 and 43 and a secondary 44. One end of the secondary 44 is connected by a wire 45 to the left end of the relay coil 34 and the other end of the secondary 44 is connected by a wire 46 to the right end of the relay coil 35. The adjacent ends of the relay coils 34 and 35 are connected together. By reason of these wiring connections, the relay coils 34 and 35 are connected in series and across the secondary 44.

A balancing potentiometer resistance element 48 is suitably secured to a base 49 (Figure 2). The shaft 20 operated by the motor 13 has loosely mounted thereon a collar 50 to which are secured spaced contacts 51 and 52. Contacts 51 and 52 are insulated from each other and from the collar 50 by insulating pads 53. The contacts 51 and 52 slidably engage the balancing potentiometer resistance element 48. A second collar 54 is rigidly secured to the shaft 20 by a screw 55 and this collar carries by means of insulating pads 56 a slider 57 which also slidably engages the resistance element 48. Slider 57 is located between the contacts 51 and 52. A spring member 58 is inserted between the collars 54 and 50 to hold the collar 50 in engagement with friction washers 59 and since these washers also engage the stationary circuit 49, the collar 50 is frictionally held stationary with respect to the base 49 and the resistance element 48. The collar 50 is supplied with pins 60 and 61 which are adapted to be engaged by the insulating pad 56 carrying the slider 57. Upon rotation of the shaft 20 the slider 57 is moved across the potentiometer resistance element 48 and when the slider 57 is moved sufficiently far it engages the pins 60 and 61 and overcomes the friction means to also cause movement of the slider 51 and 52. The slider 51 and 52 form the end terminals of the balancing potentiometer and since these sliders are frictionally mounted it may be well stated that the resistance element of the balancing potentiometer is frictionally mounted.

The left end of the relay coil 34 is connected by a protective resistance 62 and wires 63 and 64 to the left-hand end of the control potentiometer resistance element 32 and the contact 51. In a like manner, the right-hand end of the relay coil 35 is connected by a protective resistance 65 and wires 66 and 67 to the right-hand end of the control potentiometer resistance element 32 and the contact 52. The junction of the relay coils 34 and 35 are connected by wires 68, 69 and 70 to the slider 31 of the control potentiometer and the slider 57 of the balancing potentiometer. By reason of these wiring connections, it is seen that the balancing potentiometer is formed by that portion of the resistance 48 included between the contacts 51 and 52. It is also seen that the control potentiometer, the balancing potentiometer and the series connected relay coils 34 and 35 are all connected in parallel and across the secondary 44 of the step-down transformer 40.

Upon a decrease in space temperature, the slider 31 moves to the left in the direction indicated by the character C and by reason of the above noted parallel relationship this causes partial short circuiting of the relay coil 34 to decrease the energization thereof and to increase the energization of the relay coil 35. These unequal energizations of the relay coils 34 and 35 operate the armature 36 to move the switch arm 37 into engagement with the contact 39. Movement of the switch arm 37 into engagement with the contact 39 completes a circuit from the line wire 42, through wire 72, switch arm 37, contact 39, wire 73, limit switch 27, wire 74, field winding 25, and wire 75 back to the other line wire 43. Completion of this circuit energizes the field winding 25 to move the valve 16 towards an open position to supply additional heat to the space. Movement of the valve 16 also causes right-hand movement of the slider 57 of the balancing potentiometer 14. This right-hand movement partially short-circuits the relay coil 35 to decrease the energization thereof and to increase the energization of the relay coil 34. When the slider 57 has moved sufficiently far to the right so as to rebalance the relay coils 34 and 35, the switch arm 37 is moved out of engagement with the contact 39 and the valve 16 is then held in its newly adjusted position.

An increase in space temperature causes movement of the slider 31 to the right in the direction indicated by the character H. This right-hand movement of the slider 31 partially short-circuits the relay coil 35 to decrease the energization thereof and to increase the energization of the relay coil 34. As a result of these unequal energizations of the relay coils 34 and 35, the switch arm 37 is moved into engagement with the contact 38 to complete a circuit from the line wire 42 through wire 72, switch arm 37, contact 38, wire 76, limit switch 28, wire 77, field winding 24, and wire 75 back to the other wire 43. Completion of this circuit energizes the field winding 24 to move the valve 16 towards a closed position which decreases the supply of heat to the space. Movement of the valve 16 towards a closed position also causes left-hand movement of the slider 57 of the balancing potentiometer. This, in turn, partially short-circuits the relay coil 34 to decrease the energization thereof and to increase the energization of the relay coil 35. When the slider 57 has moved sufficiently far to the left to cause the energizations of the relay coils 34 and 35 to be rebalanced, the switch arm 37 is moved out of engagement with the contact 38 to break the circuit through the field winding 24. The valve 16 is thereupon held in its newly adjusted position.

By reason of the above described follow-up control system, the valve 16 is positioned in accordance with variations in space temperature and the space temperature is maintained within predetermined limits. However, a follow-up system of this type has what is known as a "drooping" characteristic, that is, when the heating load is relatively great the temperature maintained is lower than when the heating load is relatively light. In order to minimize this inherent "drooping" characteristic, more heat must be supplied to the space when the heating load is great and less heat must be supplied to the space when the heating load is light.

To accomplish this mode of operation, the reset mechanism generally designated at 15 and incorporating the friction means is utilized. The pins 60 and 61 carried by the collar 50 are so spaced that movement of the slider 57 therebetween through the range designated B will rebalance the relay 12 upon movement of the slider 31 of the control potentiometer a given distance from the desired normal position, the amount of which is indicated by the character A. Therefore, unbalancing of the relay by relatively slight deviations in space temperature within the range A will be rebalanced by the movement of the slider 57 of the balancing potentiometer within the range B and a true modulating control of the valve 16, as pointed out above, is brought about. If, however, the space temperature should decrease beyond this range designated A, the valve 16 will be moved toward an open position and the slider 57 will engage the pin 61 and since the relay is not rebalanced by this movement of the slider 57, the valve 16 will continue in its movement towards an open position to supply additional heat to the space to make up for the additional heating load. When sufficient heat is supplied to the space by this additional opening of the valve 16, the slider 31 will move back into the control range A and the relay 12 will be rebalanced to stop further opening of the valve 16. Since this operation has caused right-hand movement of the sliders 51 and 52 and since the relay 12 is now balanced, the valve 16 will be reset in a different position with respect to the value of the condition being controlled. Specifically, the valve 16 will be farther towards an open position than it was before this last mentioned sequence of operation took place. Therefore, as a result of an increase in load on the heating system, the valve 16 is positioned farther towards an open position to supply additional heat to the space to make up for this additional heating load.

In a like manner, if the load on the heating system decreases sufficiently to cause right-hand movement of the slider 31 of the control potentiometer out of the control range A, the slider 57 engages the pin 60 and since the slider 57 cannot rebalance the relay 12 the valve 16 is continued in its movement in the closing direction to decrease the supply of heat to the space. As a result of this decrease of the supply of heat to the space, the space temperature decreases and the slider 31 is moved back into the control range A, whereupon the relay 12 is rebalanced and further closing movement of the valve 16 is prevented. The valve 16 is in this manner reset to a new position with respect to the value of the space temperature, this new position being under the circumstances a position closer to the closed position to decrease the supply of heat to the space in accordance with the decrease in the load on the heating system.

By reason of the above control system, the valve 16 is positioned directly in accordance with slight variations in space temperature from the desired normal value but when the space temperature varies a relatively large amount from the desired normal value, which variation is caused by an increase or a decrease in the heating load, the valve 16 is reset with respect to the position of the control potentiometer whereby the supply of heat to the space is not only regulated according to changes in temperature but is also regulated in accordance with variations in the load on the heating system.

Although for purposes of illustration, one form of this invention has been shown, other forms thereof may become obvious to those skilled in the art upon reference to this specification and, therefore, my invention is to be limited only by the scope of the appended claims and prior art.

I claim as my invention:

1. In combination, a device to be positioned in a plurality of positions to control the value of a condition to be controlled, control resistance means the resistance value of which is varied in accordance with changes in the value of the condition to be controlled, relay means in control of said device, balancing resistance means including a resistance member and a slider member, means for operating one of the members upon operation of the device, slidable contact means engaging said balancing resistance member, connections between said control resistance means, said relay means and the slider member and contact means of the balancing resistance means, means tending to hold the contact means stationary with respect to the balancing resistance member, and means operated by said device for overcoming said last mentioned means to move the contact means with respect to said balancing resistance member.

2. In combination, a device to be positioned in a plurality of positions to control the value of a condition to be controlled, control resistance means the resistance value of which is varied in accordance with changes in the value of the condition to be controlled, relay means in control of said device, balancing resistance means including a resistance member and a slider member, means for operating one of the members upon operation of the device, slidable contact means engaging said balancing resistance member, connections between said control resistance means, said relay means and the slider member and contact means of the balancing resistance means, friction means for holding the contact means stationary with respect to the balancing resistance member, and means operated by said device for overcoming said friction means for moving the contact means with respect to said balancing resistance member.

3. In combination, a device to be positioned in a plurality of positions for controlling the value of a condition, a control potentiometer, means for adjusting the control potentiometer in accordance with changes in the value of the condition to be controlled, relay means for controlling the operation of said device, a balancing potentiometer comprising a resistance member, a slider member and contacts on either side of the slider member and engaging the resistance member, means for adjusting the balancing potentiometer upon operation of the device, connections between the relay means, the control potentiometer and the slider member and contacts of the balancing potentiometer, and friction means for holding the contacts stationary with respect to the resistance member, said friction means permitting movement of the contacts with respect to the resistance member when they are engaged by the slider member to cause resetting of the device to be controlled with respect to the value of the condition to be controlled.

4. In a combined rebalancing and reset mechanism for a relay which controls the operation of a device, the combination of, an elongated resistance member, spaced contacts engaging said resistance member, the spacing of said contacts being less than the length of said resistance member, friction means for holding the contacts fixed with respect to the resistance member, a slider member engaging the resistance member between the contacts, and means for operating one of the members with respect to the other, said means causing movement of the contacts with respect to the resistance member upon the occurrence of a predetermined amount of relative movements between the members.

5. In combination, a device to be positioned in a plurality of positions to control the value of a condition to be controlled, control resistance means the resistance value of which is varied in accordance with changes in the value of the condition to be controlled, relay means in control of said device, balancing resistance means including a frictionally mounted resistance member and a slider member contacting the same, means for operating one of the members with respect to the other upon a predetermined amount of movement of the device and for operating both members upon further movement of the device in the same direction, and connections between the control resistance means, the relay means and the balancing resistance means.

6. In combination, a device to be positioned in a plurality of positions for controlling the value of a condition, a control potentiometer, means for adjusting the control potentiometer in accordance with changes in the value of the condition to be controlled, relay means for controlling the operation of said device, a balancing potentiometer comprising a frictionally mounted resistance member and a slider member contacting the same, means for operating one of the members with respect to the other upon a predetermined amount of movement of the device and for operating both members upon further movement of the device, and connections between the relay means, the control potentiometer and the balancing potentiometer.

JOHN E. HAINES.